Figure 1:
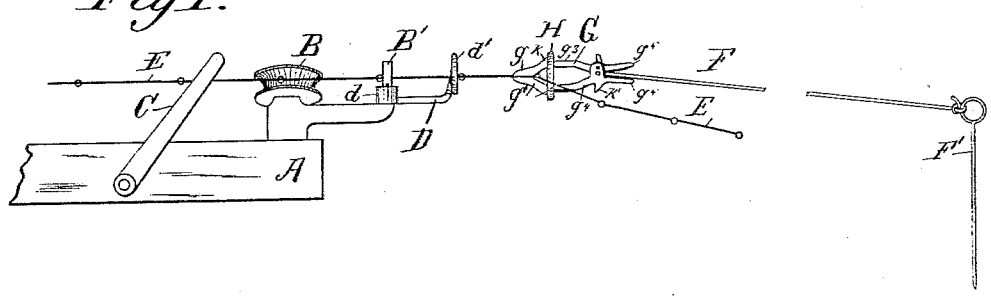

(No Model.)

C. E. SWENEY.
CHECK ROWER APPARATUS FOR CORN PLANTERS.

No. 318,931. Patented May 26, 1885.

Witnesses:
Taylor E. Brown
Lew. E. Curtis

Inventor:
Chas. E. Sweney
By Price & Fisher
his Attorneys

UNITED STATES PATENT OFFICE.

CHARLES E. SWENEY, OF PIERCETON, INDIANA.

CHECK-ROWER APPARATUS FOR CORN-PLANTERS.

SPECIFICATION forming part of Letters Patent No. 318,931, dated May 26, 1885.

Application filed January 12, 1885. (No model.)

*To all whom it may concern:*

Be it known that I, CHARLES E. SWENEY, a citizen of the United States, residing at Pierceton, in the county of Kosciusko and State of Indiana, have invented certain new and useful Improvements in Check-Rower Apparatus for Corn-Planters, of which I do declare the following to be a full, clear, and exact description, reference being had to the accompanying drawings, forming part of this specification.

In the construction of check-rowers now commonly employed in connection with corn-planters it is customary to support the knotted line or wire upon pulleys placed in front of and behind the operating arm or wheel by which the slides or valves of the seed-boxes are intermittently opened and closed as the planter traverses the field. When the planter approaches the end of the check-row line, which is anchored to suitable stakes in the ground, the driver dismounts, releases the line from its supporting-pulleys, turns his team into proper position for planting the next succeeding rows, replaces the check-row line upon the pulleys, and proceeds to recross the field. This method of operating the planter is objectionable, not only for the reason that much time is lost thereby, but for the further reason that the driver, if at all careless, or if his attention be distracted by his team, will not disconnect the check-row line at the proper times, so that all of the planted rows will be of equal length, as they should be in order to permit the rows planted across the ends of the field to correspond with those across its length.

In order to obviate the necessity of the driver's dismounting to release the check-row line from the pulleys, it has been proposed to provide the check-rower with a "throw-off" device by means of which the driver could free the check-row line from the machine without dismounting. This, however, only partially obviated the difficulties before met with, as there still existed the liability of making the planted rows of different lengths. It has also been proposed to provide the check-row line near its end with a large ball, that should co-operate with an inclined plane on the supporting-arm of the pulleys for the purpose of lifting the check-row line away from the pulleys and permitting it to drop to the ground. This last construction is not, however, adapted for use in connection with that class of check-rowers wherein the check-row line crosses from side to side of the machine.

My present invention has for its object to provide improved means whereby the check-row line shall be automatically and with certainty relieved from operating the planter as it completes the traverse of the field, so that the rows of planted grain will be of equal length, and the driver need not dismount from the machine until he has turned his team into proper position to recross the field.

To this end my invention consists, primarily, in providing means whereby the check-row line may be connected with the anchor in such manner that as the planter reaches the end of the field this line will be automatically freed from the anchor, so that the line will cease to operate the feed-slides, and the driver can turn his team without dismounting.

My invention also consists in providing the anchor-line with a device for detachably holding the check-row line in connection therewith.

My invention further consists in various novel features of constructions, all of which will be hereinafter described, and particularly defined in the claims at the end of this specification.

Figure 2:
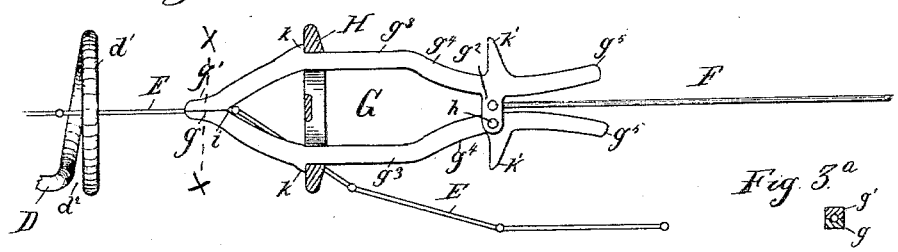
Figure 3:
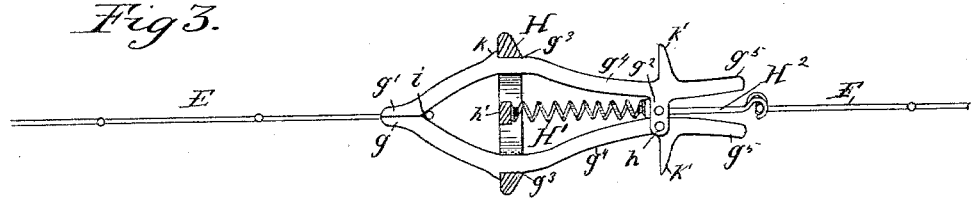
Figure 4:
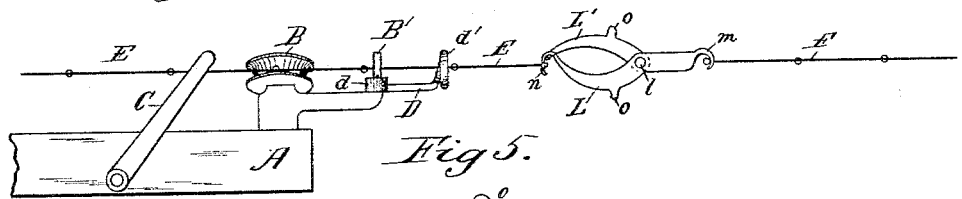
Figure 5:
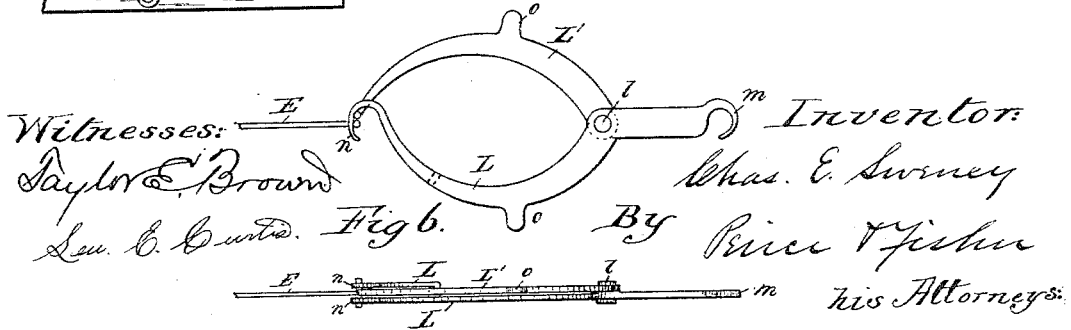

Figure 1 is a view in side elevation of a portion of a check-rower with my improvements applied thereto. Fig. 2 is an enlarged side view in detail of the improved detachable holder for the check-row line. Fig. 3 is a view partly in section and partly in side elevation of a somewhat modified form of detachable holder for the check-row line. Fig. 3ª is a sectional view on line $x$ $x$ of Fig. 2. Fig. 4 is a view in side elevation of a portion of a check-rower with a modified form of my improvement applied thereto. Fig. 5 is an enlarged detail view in side elevation, and Fig. 6 is a view in plan of the form of detachable line-holders shown in Fig. 4.

The present invention is applicable to the various forms of check-rower corn-planters now commonly used, and is particularly well adapted for use in that class of planters wherein the check-row line crosses the machine, and for which no other existing form of releasing device, so far as I am aware, is suited.

A designates the main beam of the check-rower, which sustains the usual supporting-pulleys, B, and guide-finger B', (one or more at each end,) or other suitable guides, over which the check-row line may travel, and in this beam is journaled the rocking lever C, or other device for operating the slides of the seed-boxes of the planter.

Upon the lower part of the guide-finger B', or suitably connected to any other part of the machine, is hung the tripping device D, the rear end, $d$, of which fits over the guide-finger B', and the forward end, $d'$, is formed, preferably, in the shape of a split ring or loop, through the space $d^2$ of which the check-row line may be readily inserted.

Over the guide-pulley B, and through the ring of the tripping device, passes the knotted check-row line E, which may be of any of the forms commonly employed in this class of machines. This check-row line is detachably connected to the line F of a suitable anchor or stake, F', by means of the line-holder G. This line-holder may be made of any suitable form adapted to permit the ready detachment of the check-row line without departing from the spirit of my invention.

In the construction of line-holder illustrated in Figs. 1, 2, and 3 $g$ and $g'$ denote the retaining-jaws, which are pivoted together, as at $h$, and the rear portion of one of these jaws is provided with the shank $g^2$, by which suitable attachment is made with the anchor-line. The forward ends of the retaining-jaws are grooved, as seen in Fig. $3^n$, to admit the check-row line, and the inner sides of the jaws are inclined, as seen at $i$, so as to permit the ready withdrawal of this line when the guard for the jaws is in such position as to allow them to open. This guard consists, preferably, of a ring, H, of a size adapted to fit snugly around the straight portion $g^3$ of the jaws and hold them in closed position. Front and rear stops, $k$ and $k'$, upon the jaws prevent the withdrawal of the guard-ring from the holder; but it will be readily seen that when this ring is above the inclined portion $g^4$ of the jaws they will be free to open. The rear ends, $g^5$, of the retaining-jaws are curved outwardly, as shown, and enable the jaws to be opened when the check-row line is to be placed therein. By forming the line-holder with the open space behind the retaining ends of the jaws this holder may be quickly attached to a check-row line of any length without the necessity of breaking the same, it being only necessary to clamp the retaining-jaws over the line in front of one of the knots or knobs of the line.

In the slightly modified form of line-holder shown in Fig. 3 the guard-ring H is held normally in locked position by means of the spiral compression-spring H', one end of which is attached to the cross-bar $h'$ of the guard, while the other end bears against a suitable shoulder on the shank $g^2$ of the holder. When a spring is thus employed, the straight portions of the retaining-jaws may terminate abruptly behind the guard-ring. In this construction, also, a hook, H², having the retaining-fingers at its end, may be used, so that the detachable line-holder may be placed at any point of the check-row line by severing the line at one of its detachable joints and connecting one of the free ends between the retaining-jaws and the other between the fingers of the hook H².

The operation of the above-described construction is as follows: The anchor having been fixed in proper position at the end of the field, and the detachable line-holder having been connected to the check-row line in the manner described, the planter proceeds across the field in the usual way until it reaches the end, when the detachable line-holder passes into the ring of the tripping-device D, which at once forces back the guard-ring H, and hence permits the jaws of the holder to release the check-row line, which will then cease to operate the seed-box slides. The driver can then without dismounting turn his team into proper position to recross the field. By thus automatically releasing the check-row line not only is time saved, but the planted rows will all be made of equal length without any care on the part of the driver.

It will be readily understood that any suitable form of tripping device adapted to release the guard of the line-holder at the proper time may be employed, and I do not wish my invention to be understood as restricted to the precise construction shown.

The modified form of line-holder shown in Figs. 4, 5, and 6 consists of the sections L and L', hinged together at $l$, the section L being provided at one end with the hook $m$, for attachment to the anchored end of the check-row line, and at its opposite end with the hooked fingers $n$, to retain the end of the main portion of the line. Within the hooked fingers $n$ and above the attached end of the check-row line rests the bent end of the section L', which, when the sections of the holder are compressed, serves to force the end of the check-row line out of the hooked fingers $n$. Upon the exterior of the sections L and L' will be formed the stop-lugs $o$, to prevent the sections from passing through the tripping device into the machine. From this construction it will be seen that as the planter reaches the end of its course the sections L and L' of the line-holder will be compressed, so as to detach the check-row line, thus automatically throwing it out of operation, and permitting the planter to be turned into position to recross the field.

It will be readily seen that my improved detachable line-holder will be useful not only in connection with a tripping device on the planter, but also in the ordinary methods of operating check-rowers where it is desirable to afford a ready means for quickly connecting and disconnecting a check-row line of any length with the anchor.

I am aware that it has been heretofore proposed to provide means whereby boats may be automatically detached from their davits, and pile-driver weights from their lifting-ropes; but I am not aware that prior to my invention a check-row line for corn-planters has been connected with its anchor-line in such manner that it could be automatically and quickly detached therefrom, so as to accomplish the desirable functions hereinbefore fully described.

Having thus described my invention, what I claim as new, and desire to secure by Letters Patent, is—

1. The combination, with an anchor-line for check-row lines, of an automatically-detachable line-holder, substantially as described.

2. The combination, with an anchor and an anchor-line for check-row lines, of a line-holder having a portion adapted to be connected to the anchor-rope and a portion adapted to detachably hold the check-row line, substantially as described.

3. The combination, with an anchor and an anchor-line for check-row lines, of a line-holder having retaining jaws for detachably holding the check-row line, substantially as described.

4. The combination, with the anchor-line for check-row lines, of a line-holder having retaining-jaws for detachably holding the check-row line, and having a guard for temporarily holding said jaws in locked position, substantially as described.

5. The combination, with the anchor-line, of the line-holder having the retaining-jaws, the guard-ring for said jaws, and the stops for holding the guard-ring on the jaws, substantially as described.

6. The combination, with the anchor-line for corn-planter check-row lines, of the line-holder having the retaining-jaws, the guard, and a spring for temporarily holding said guard in locked position, substantially as described.

7. An anchor attachment for check-row lines, consisting of pivoted retaining-jaws, a guard-ring for said jaws, stops for said guard-ring, and projecting arms for opening said jaws to insert the check-row line, substantially as described.

8. The combination, with the anchor-line for a corn-planter check-row line, of a line-holder having retaining-jaws arranged to clamp onto the check-row line at any desired point in its length, substantially as described.

9. The combination, with the anchor-line, the check-row line, and detachable line-holder for connecting the two, of a check-rower having a tripping device for releasing the line-holder, substantially as described.

10. The combination, with the anchor-line, the check-row line, and a detachable line-holder for connecting the two, of a check-rower provided with a tripping device for releasing the line-holder, said tripping device having an open portion to permit the insertion of the check-row line, substantially as described.

CHARLES E. SWENEY.

Witnesses:
H. O. KING,
W. N. GRAVES.